United States Patent [19]
Watanabe

[11] Patent Number: 5,432,615
[45] Date of Patent: Jul. 11, 1995

[54] COMPRESSION/DECOMPRESSION METHOD FOR IMAGE DATA

[75] Inventor: Mitsuhiro Watanabe, Tokyo, Japan

[73] Assignee: NEC Corporation, Tokyo, Japan

[21] Appl. No.: 262,935

[22] Filed: Jun. 21, 1994

[30] Foreign Application Priority Data

Jun. 21, 1993 [JP] Japan .................................. 5-172114

[51] Int. Cl.6 ............................................. H04N 1/415
[52] U.S. Cl. ..................................... 358/432; 348/420
[58] Field of Search ..................... 358/433, 432, 261.3; 348/420, 405, 408, 384, 390

[56] References Cited

U.S. PATENT DOCUMENTS 4,974,078 11/1990 Tsai ...................................... 348/408
5,337,049 8/1994 Shimoda ............................. 348/420

Primary Examiner—Scott A. Rogers
Attorney, Agent, or Firm—Sughrue, Mion, Zinn, Macpeak & Seas

[57] ABSTRACT

A compression/decompression method for image data allows addition of a code amount control amount in units of data of one block without necessitating an excessive header capacity. In compression, a quantization conversion coefficient of a quantization conversion coefficient set is replaced with a code amount control amount, and a resulted quantization conversion coefficient set is coded, whereafter a quantization coefficient of a quantization coefficient set corresponding to the code amount control amount of the quantization conversion coefficient set is changed to 0. In decompression, the quantization coefficient set is extracted, and coded data are decoded in units of data of one block. Then, the code amount control amount is extracted from the quantization conversion coefficient set of the decoded data.

22 Claims, 9 Drawing Sheets

FIG.2(a)

[S1J] CONVERSION COEFFICIENT SET

| -732 | -72 | -204 | 43 | 96 | -1 | -26 | -27 |
|---|---|---|---|---|---|---|---|
| -22 | -1 | -14 | -10 | -16 | -6 | -9 | -10 |
| 0 | 18 | 20 | -18 | 3 | 0 | 8 | -16 |
| -18 | 20 | 21 | 0 | 7 | -7 | -14 | -18 |
| 0 | 0 | 8 | 0 | 0 | -9 | 0 | 32 |
| 10 | -16 | -6 | 7 | 30 | 13 | -10 | 20 |
| 0 | 12 | 0 | -26 | -36 | 7 | 9 | 42 |
| 0 | 0 | 14 | 12 | 0 | 11 | -12 | -12 | 0 |

÷

[Q1J] QUANTIZATION COEFFICIENT SET

| 16 | 14 | 10 | 12 | 14 | 18 | 24 | 40 |
|---|---|---|---|---|---|---|---|
| 13 | 16 | 19 | 16 | 17 | 22 | 35 | 37 |
| 26 | 24 | 19 | 24 | 22 | 51 | 57 | 51 |
| 29 | 40 | 49 | 61 | 51 | 58 | 64 | 68 |
| 56 | 58 | 60 | 72 | 56 | 64 | 72 | 87 |
| 87 | 69 | 78 | 92 | 55 | 69 | 80 | 113 |
| 95 | 98 | 109 | 104 | 103 | 98 | 81 | 77 |
| 121 | 112 | 62 | 103 | 100 | 112 | 103 | 99 |

× K

=

[R1J] QUANTIZATION CONVERSION COEFFICIENT SET

| -45/k | -2/k | 0 | -1/k | 0 | 0 | 0 | 0 |
|---|---|---|---|---|---|---|---|
| -7/k | 0 | -1/k | -1/k | 0 | 0 | 0 | 0 |
| -17/k | -1/k | -1/k | 0 | 0 | 0 | 0 | 0 |
| 3/k | -1/k | -1/k | 0 | 0 | 0 | 0 | 0 |
| 9/k | -1/k | 0 | 0 | 0 | 0 | 0 | 0 |
| 0 | 0 | 0 | 0 | 0 | 0 | 0 | 0 |
| -2/k | 0 | 0 | 0 | 0 | 0 | 0 | 0 |
| -2/k | 0 | 0 | 0 | 0 | 0 | 0 | 0 |

FIG.2(b)

[S1J'] CONVERSION COEFFICIENT SET

| -736 | -77 | 204 | 42 | 96 | 0 | -32 | -28 |
|---|---|---|---|---|---|---|---|
| -26 | 0 | -18 | -17 | -16 | 0 | 0 | 0 |
| 0 | 24 | 22 | -22 | 0 | 0 | 0 | 0 |
| -29 | 40 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

$=$ $\times$ K

[Q1J'] QUANTIZATION COEFFICIENT SET

| 16 | 11 | 12 | 14 | 12 | 10 | 16 | 14 |
| 13 | 12 | 14 | 18 | 17 | 19 | 24 | 40 |
| 26 | 14 | 18 | 22 | 16 | 49 | 35 | 37 |
| 29 | 24 | 22 | 24 | 22 | 60 | 57 | 51 |
| 56 | 40 | 58 | 51 | 61 | 78 | 64 | 68 |
| 87 | 55 | 64 | 72 | 56 | 92 | 109 | 87 |
| 95 | 69 | 55 | 56 | 80 | 104 | 81 | 113 |
| 121 | 98 | 103 | 104 | 103 | 62 | 77 | 0 |
| | 112 | 100 | 120 | 92 | 101 | 103 | |

$\times$

[R1J'] QUANTIZATION CONVERSION COEFFICIENT SET

| $\frac{-46}{k}$ | $\frac{-7}{k}$ | $\frac{-17}{k}$ | $\frac{3}{k}$ | $\frac{8}{k}$ | 0 | $\frac{-2}{k}$ | $\frac{-2}{k}$ |
|---|---|---|---|---|---|---|---|
| $\frac{-2}{k}$ | 0 | $\frac{-1}{k}$ | $\frac{-1}{k}$ | $\frac{-1}{k}$ | 0 | 0 | 0 |
| 0 | $\frac{-1}{k}$ | $\frac{-1}{k}$ | $\frac{-1}{k}$ | 0 | 0 | 0 | 0 |
| $\frac{-1}{k}$ | $\frac{-1}{k}$ | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | k |

FIG.3(a)

$$[R_{ij}] = [Q_{ij}] \div [S_{ij}] \times 2$$

[Rij]:

| -1  | 0 | 0 | 0 | 0 | 0 | 0 | 0 |
|-----|---|---|---|---|---|---|---|
| -1  | 0 | 0 | 0 | 0 | 0 | 0 | 0 |
| 0   | 0 | 0 | 0 | 0 | 0 | 0 | 0 |
| 4   | 0 | 0 | 0 | 0 | 0 | 0 | 0 |
| 2   | 0 | 0 | 0 | 0 | 0 | 0 | 0 |
| -8  | 0 | 0 | 0 | 0 | 0 | 0 | 0 |
| 3   | 0 | 0 | 0 | 0 | 0 | 0 | 0 |
| -23 | -1| 0 | 0 | 0 | 0 | 0 | 0 |

[Qij]:

| 14 | 40 | 37 | 51 | 68 | 87  | 113 | 99  |
|----|----|----|----|----|-----|-----|-----|
| 16 | 24 | 35 | 57 | 64 | 81  | 77  | 103 |
| 10 | 19 | 49 | 60 | 78 | 109 | 62  | 101 |
| 12 | 16 | 24 | 61 | 92 | 80  | 103 | 92  |
| 14 | 17 | 22 | 51 | 72 | 56  | 104 | 120 |
| 12 | 18 | 22 | 58 | 64 | 55  | 103 | 100 |
| 11 | 14 | 24 | 40 | 55 | 69  | 98  | 112 |
| 16 | 13 | 26 | 29 | 56 | 87  | 95  | 121 |

[Sij]:

| -732 | -27 | -26 | -1 | -16 | -18 | 32  | 20  | 42  | 0   |
|------|-----|-----|----|-----|-----|-----|-----|-----|-----|
| -204 | -22 | -9  | -6 | 3   | 0   | 0   | -10 | 9   | -12 |
| -14  | -1  | 8   | 0  | 7   | 0   | 13  | -26 | 7   | 0   |
| 20   | 18  | -14 | -7 | 0   | 7   | -9  | -36 | -12 | 12  |
| 21   | 20  | -10 | -9 | 0   | -6  | 30  | 0   | 11  | 0   |
| 8    | 0   | -18 | 13 | 0   | 10  | -26 | 12  | -12 | 14  |

(FIG.3(a) — matrices [R_{ij}], [Q_{ij}], [S_{ij}])

FIG.3(b)

[Sij] =

| -28 | 0 | 0 | 0 | 0 | 0 | 0 | 0 |
|---|---|---|---|---|---|---|---|
| -32 | 0 | 0 | 0 | 0 | 0 | 0 | 0 |
| 0 | 0 | 0 | 0 | 0 | 0 | 0 | 0 |
| 96 | 0 | 0 | 0 | 0 | 0 | 0 | 0 |
| 48 | 0 | 0 | 0 | 0 | 0 | 0 | 0 |
| 192 | 0 | 0 | 0 | 0 | 0 | 0 | 0 |
| 66 | 0 | 0 | 0 | 0 | 0 | 0 | 0 |
| -736 | -26 | 0 | 0 | 0 | 0 | 0 | 0 |

× 2

[Qij']

| 14 | 40 | 37 | 51 | 68 | 87 | 113 | 0 |
|---|---|---|---|---|---|---|---|
| 16 | 24 | 35 | 57 | 64 | 81 | 77 | 103 |
| 10 | 19 | 49 | 60 | 78 | 109 | 62 | 101 |
| 12 | 16 | 24 | 61 | 92 | 80 | 103 | 92 |
| 14 | 17 | 22 | 51 | 72 | 56 | 104 | 120 |
| 12 | 18 | 22 | 58 | 64 | 55 | 103 | 100 |
| 11 | 14 | 24 | 40 | 55 | 69 | 98 | 112 |
| 16 | 13 | 26 | 29 | 56 | 87 | 95 | 121 |

×

[Rij']

| -1 | 0 | 0 | 0 | 0 | 0 | 0 | 2 |
|---|---|---|---|---|---|---|---|
| -1 | 0 | 0 | 0 | 0 | 0 | 0 | 0 |
| 0 | 0 | 0 | 0 | 0 | 0 | 0 | 0 |
| 4 | 0 | 0 | 0 | 0 | 0 | 0 | 0 |
| 2 | 0 | 0 | 0 | 0 | 0 | 0 | 0 |
| -8 | 0 | 0 | 0 | 0 | 0 | 0 | 0 |
| 3 | 0 | 0 | 0 | 0 | 0 | 0 | 0 |
| -23 | -1 | 0 | 0 | 0 | 0 | 0 | 0 |

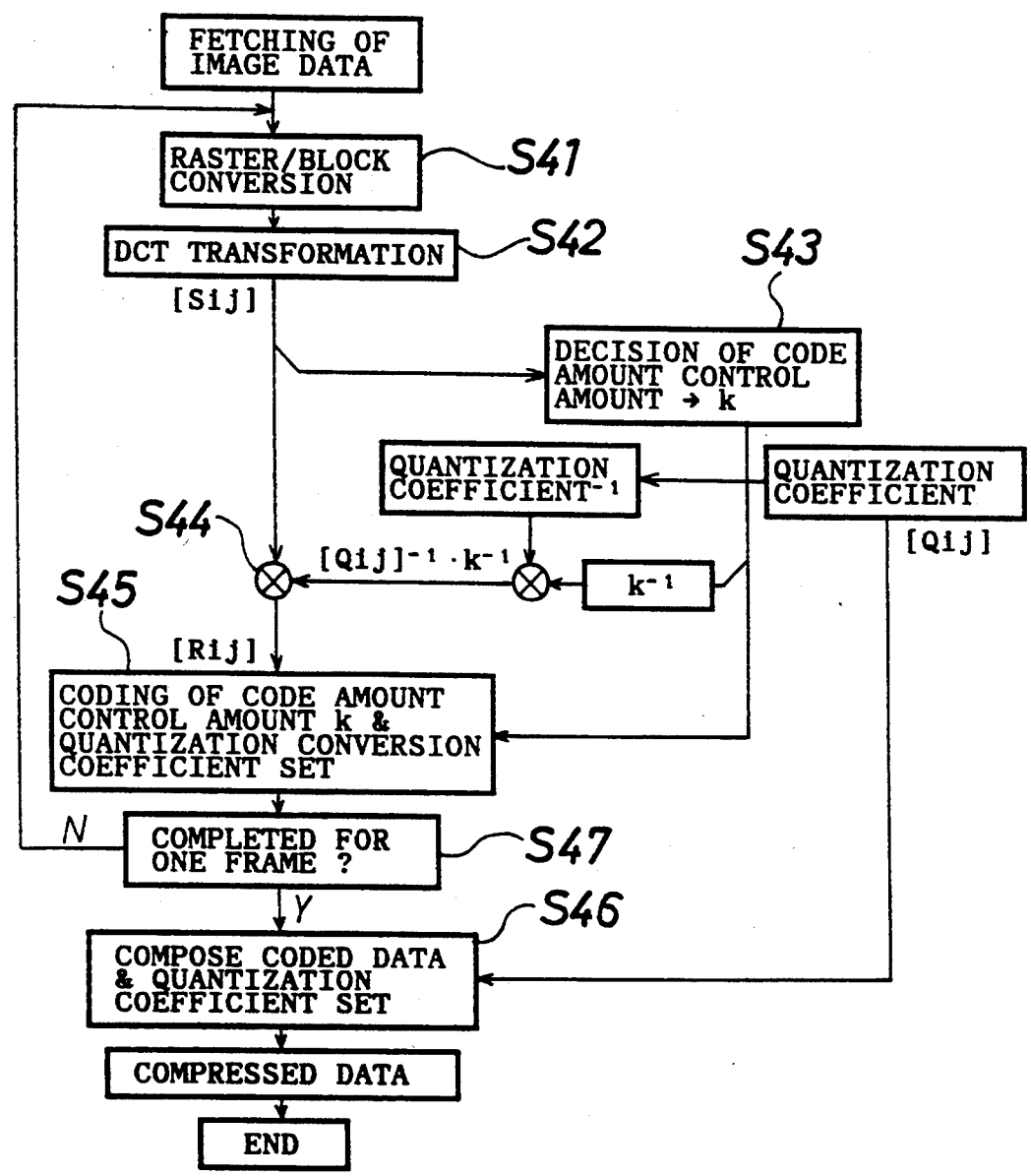

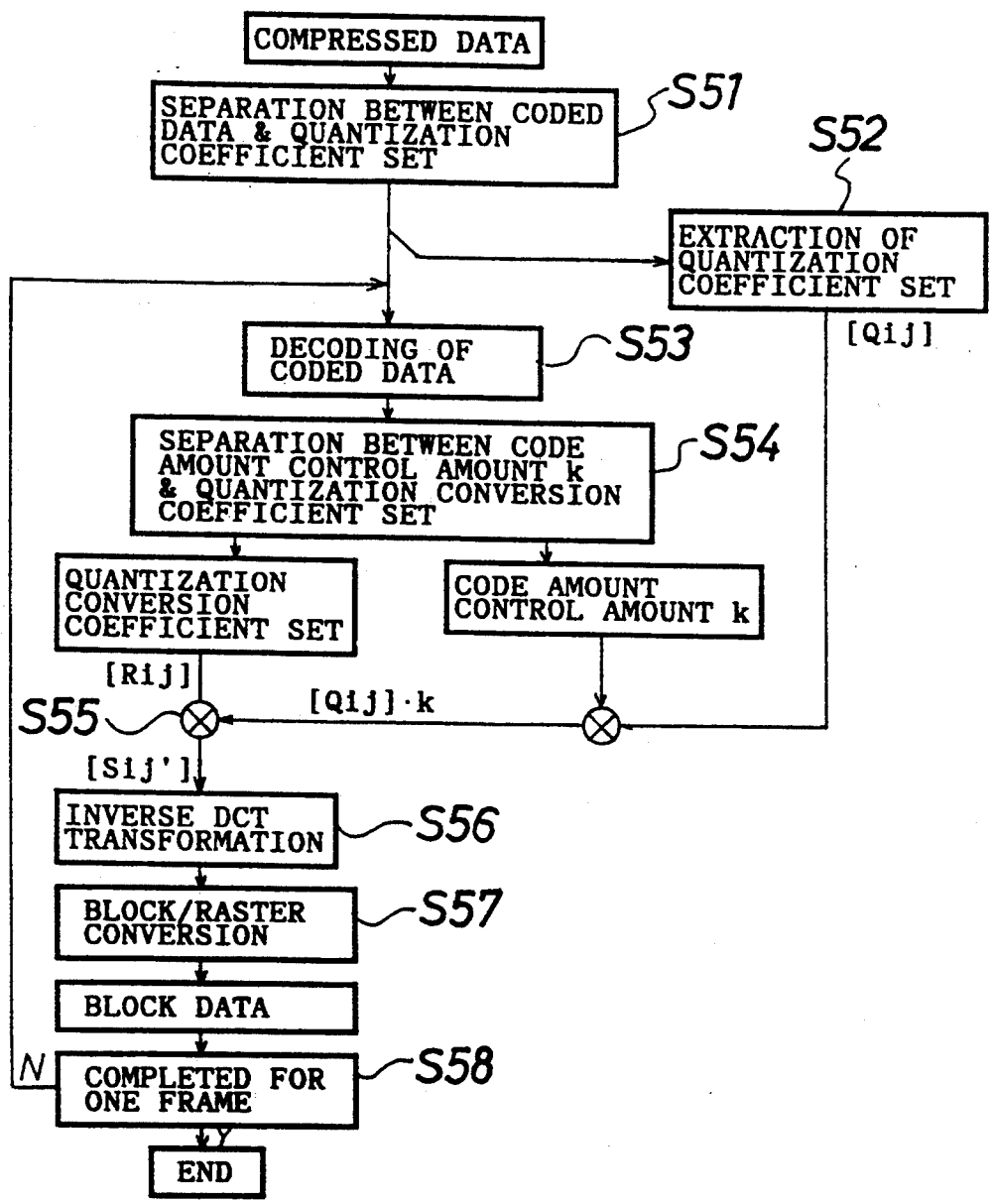

COMPRESSION/DECOMPRESSION METHOD FOR IMAGE DATA

BACKGROUND OF THE INVENTION

1. Field of the Invention

This invention relates to a compression/decompression method for image data, and more particularly, to a compression/decompression method for image data for controlling the amount of codes to be generated.

2. Description of the Related Art

In conventional compression/decompression methods for image data, control of the amount of codes is performed in units of one frame (screen) using a quantization table in accordance with the JPEG (Joint Photographic Coding Experts Group) standards.

Also systems which control the amount of codes in units of a block of m*n (m and n are positive integral numbers) dots are already known. With the systems, however, since the amount of codes is controlled in units of a block, a large number of code amount control amounts are generated for one frame. It is a possible countermeasure to prepare a header for each frame at a top portion of compressed data after coding and store a large number of code amount control amounts into the header in order to store the large number of code amount control amounts. However, where code amount control amounts are stored in the header, it is difficult to determine to which block data a code amount control amount corresponds. In addition the capacity required for storing code amount control amounts is excessive.

Further, image coding systems are known, wherein image data is divided for individual blocks and an optical image conversion method is selected for each block to effect compression (refer to Japanese Patent Laid-Open Application No. Showa 61-285869). However, since the criterion for selection of which system is optimum is unknown, they are not very practical in use, and increase processing.

In the conventional compression/decompression methods for image data described above, when control of the amount of codes is performed in units of a block, since the number of blocks is varied by the image size, the number of code amount control amounts varies correspondingly. Consequently, the size of a header for storing code amount control amounts varies. The conventional compression/decompression methods are thus disadvantageous in that the management of the headers is complicated and it is inconveniently complicated to establish the corresponding relationship of the individual code amount control amounts to the individual blocks.

Further, where a header is used for storage of code amount control amounts, since code amount control amounts for one frame must be stored, there is a drawback that the header capacity which must be prepared is excessive, resulting in inefficient use of the header capacity.

SUMMARY OF THE INVENTION

It is an object of the present invention to provide a compression/decompression method for image data wherein a code amount control amount can be added in units of data of one block without necessitating an excessive header amount.

It is another object of the present invention to provide a compression/decompression method wherein a code amount control amount can be added in units of data of one block without performing replacement between a quantization conversion coefficient and the code amount control amount.

According to an aspect of the present invention, there is provided a compression/decompression method for image data which comprises a code amount control amount replacing step of replacing a quantization conversion coefficient of a quantization conversion coefficient set with a code amount control amount, a coding step of coding the quantization conversion coefficient set obtained by the replacement to produce coded data, a decoding step of decoding the coded data in units of data of one block to obtain another quantization conversion coefficient set, and a code amount control amount extracting step of extracting, from the quantization conversion coefficient set obtained by the decoding, the code amount control amount which has been replaced by the quantization conversion coefficient.

According to another aspect of the present invention, there is provided a compression method for image data, which comprises a raster/block converting step of converting raster data into block data of m*n dots, m and n being positive integral numbers, a spatial frequency converting step of converting the block data obtained by the conversion by spatial frequency conversion to produce a conversion coefficient set, a code amount control amount deciding step of deciding a code amount control amount (k) for making uniform the amount of codes to be generated from the conversion coefficient set obtained by the spatial frequency conversion, a quantizing step of dividing the conversion coefficient set obtained by the spatial frequency conversion by a quantization coefficient set determined in advance for data of each one block and the code amount control amount, a code amount control amount replacing step of replacing one of quantization conversion coefficients of a quantization conversion coefficient set obtained by the quantization with the code amount control amount, a coding step of coding the quantization conversion coefficient set obtained by the replacement to produce coded data, a quantization coefficient masking step of changing a quantization coefficient of the quantization coefficient set which corresponds to the quantization conversion coefficient of the quantization conversion coefficient set to be replaced with the code amount control amount to 0, and a composing step of composing, when block data for one frame are coded, the coded data obtained by the coding at the coding step and the quantization coefficient set whose quantization coefficient has been changed to 0 at the quantization coefficient masking step to produce compressed data.

According to a further aspect of the present invention, there is provided a decompression method for image data, which decompresses image data compressed in accordance with the compression method and comprises a separating step of separating coded data and a quantization coefficient set from compressed data, a quantization coefficient set extracting step of extracting the separated quantization coefficient set, a decoding step of decoding the coded data separated at the separating step in units of data of one block to obtain a quantization conversion coefficient set, a code amount control amount extracting step of extracting, from the quantization conversion coefficient set obtained by the decoding, a code amount control amount which has been replaced by one of quantization conversion coefficients, a dequantizing step of multiplying the quantization conversion coefficient set obtained by the decoding at the decoding step by the quantization coefficient set extracted at the quantization coefficient set extracting step and the code amount control amount extracted at the code amount control amount extracting step to effect dequantization, an inverse spatial frequency converting step of converting the conversion coefficient set obtained by the dequantization by inverse spatial frequency conversion, and a block/raster converting step of performing deblocking processing to convert block data obtained by the inverse spatial frequency conversion into raster data.

According to a still further aspect of the present invention, there is provided a compression/decompression method, which comprises a coding step of coding a code amount control amount and a quantization conversion coefficient set as data of one block to produce coded data, a decoding step of decoding the coded data in units of data of one block to obtain decoded data, and a code amount control amount/quantization conversion coefficient set separating step of separating the decoded data obtained by the decoding into the code amount control amount and the quantization conversion coefficient set.

According to a yet further aspect of the present invention, there is provided a compression method for image data, which comprises a raster/block converting step of converting raster data into block data of m*n dots, m and n being positive integral numbers, a spatial frequency converting step of converting the block data obtained by the conversion by spatial frequency conversion to produce a conversion coefficient set, a code amount control amount deciding step of deciding a code amount control amount for making uniform the amount of codes to be generated from the conversion coefficient set obtained by the spatial frequency conversion, a quantizing step of dividing the conversion coefficient set obtained by the spatial frequency conversion at the spatial frequency converting step by a quantization coefficient set determined in advance for data of each one block and the code amount control amount, a coding step of coding the code amount control amount decided at the code amount control amount deciding step and the quantization conversion coefficient set obtained by the quantization at the quantizing step as data of one block to produce coded data, and a composing step of composing, when block data for one frame are coded, the coded data obtained by the coding at the coding step and the quantization coefficient set to produce compressed data.

According to a yet further aspect of the present invention, there is provided a decompression method for image data, which decompresses image data compressed in accordance with the compression method and comprises a separating step of separating coded data and a quantization coefficient set from compressed data, a quantization coefficient set extracting step of extracting the separated quantization coefficient, a decoding step of decoding the coded data separated at the separating step in units of data of one block to obtain decoded data, a code amount control amount/quantization conversion coefficient set separating step of separating the decoded data obtained by the decoding into a code amount control amount and a quantization conversion coefficient set, a dequantizing step of multiplying the separated quantization conversion coefficient by the quantization coefficient set extracted at the quantization coefficient set extracting step and the code amount control amount to effect dequantization, an inverse spatial frequency converting step of converting the conversion coefficient set obtained by the dequantization by inverse spatial frequency conversion, and a block/raster converting step of performing deblocking processing to convert block data obtained by the inverse spatial frequency conversion into raster data.

With the compression/decompression methods of the present invention, since a code amount control amount is replaced with one of quantization conversion coefficients of a quantization conversion coefficient set, a code amount control amount can be added in units of data of one block without necessitating excessive header data. Particularly as regards a quantization conversion coefficient set obtained by spatial frequency conversion such as DCT transformation, if a code amount control amount is allocated to a quantization conversion coefficient of a maximum frequency component, then this is convenient since it will not cause deterioration of the picture quality.

Further, since a code amount control amount is added to a quantization conversion coefficient set to make data for one block, advantageously a code amount control amount can be added to each quantization conversion coefficient set without performing replacement between a quantization conversion coefficient and a code amount control amount.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2(a) and 2(b) are diagrammatic views illustrating quantization and dequantization, respectively, in the compression/decompression method for image data illustrated in FIGS. 1(a) and 1(b);

FIGS. 3(a) and 3(b) are diagrammatic views showing examples of numerical values of the quantization and the dequantization, respectively, in the compression/decompression method for image data illustrated in FIGS. 1(a) and 1(b);

FIGS. 4(a) and 4(b) are flow charts illustrating the processing of a compression method and a decompression method, respectively, of another compression/decompression method for image data to which the present invention is applied.

DESCRIPTION OF THE PREFERRED EMBODIMENTS

Figure 1A:
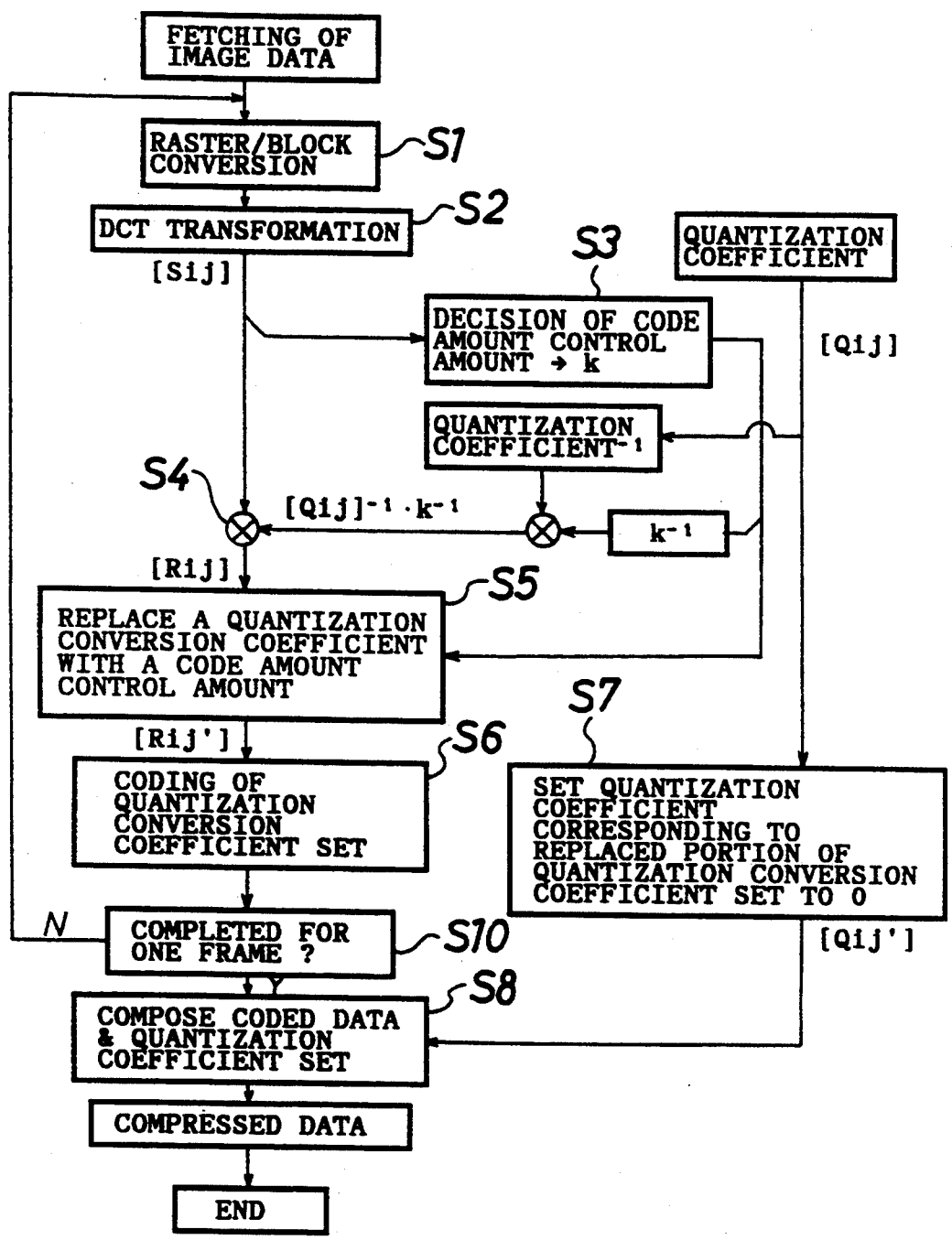
FIGS. 1(a) and 1(b) are flow charts illustrating the processing of a compression method and a decompression method, respectively, of a compression/decompression method for image data to which the present invention is applied.

FIG. 1(a) illustrates the processing of a compression method of a compression/decompression method for image data to which the present invention is applied. The present compression method comprises a raster/block converting step S1 of converting raster data into block data of, for example, 8*8 dots, a DCT transforming step S2 of transforming the block data obtained by the conversion by discrete cosine transformation (DCT) to produce a conversion coefficient set $[S_{ij}]$, a code amount control amount deciding step S3 of deciding a code amount control amount k for normalizing the amount of codes to be generated from the conversion coefficient set $[S_{ij}]$ obtained by the DCT transformation at step S2, a quantizing step S4 of dividing the conversion coefficient set $[S_{ij}]$ obtained by the DCT transformation at the DCT transforming step S2 by a quantization coefficient set $[Q_{ij}]$ determined in advance for data of each block and the code amount control amount k, a code amount control amount replacing step S5 of replacing a quantization conversion coefficient $R_{88}$ of a maximum frequency component (e.g. $R_{88}$) of a quantization conversion coefficient set $[R_{ij}]$ obtained by the quantization at step S4 with the code amount control amount k, a coding step S6 of coding the quantization conversion coefficient set $[R_{ij}']$ obtained at step S5 to produce coded data, a quantization coefficient masking step S7 of changing a quantization coefficient $Q_{88}$ of the quantization coefficient set $[Q_{ij}]$ which corresponds to the quantization conversion coefficient $R_{88}$ to be replaced with the code amount control amount k to 0 to produce another quantization coefficient set $[Q_{ij}']$, and a composing step S8 of composing, when block data for one frame are coded, the coded data and the quantization coefficient set $[Q_{ij}']$ to produce compressed data.

Figure 1B:
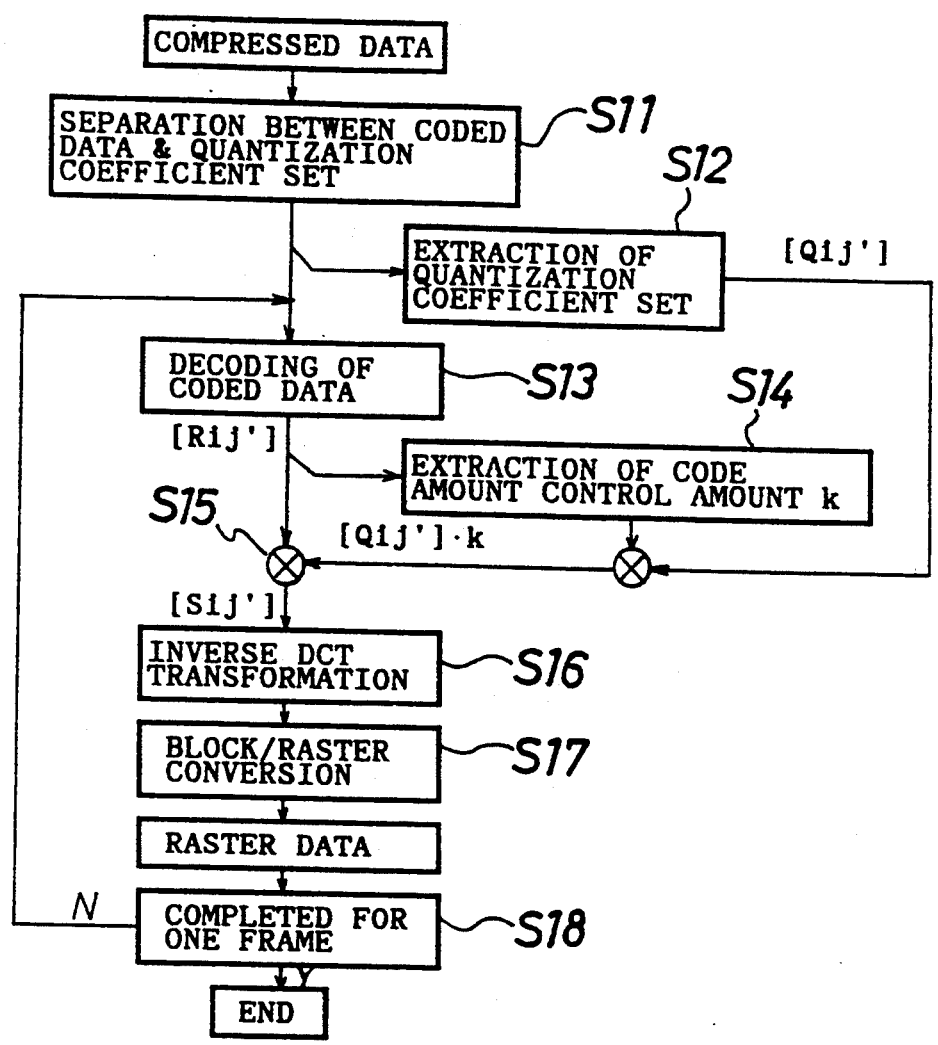
Figure 5:
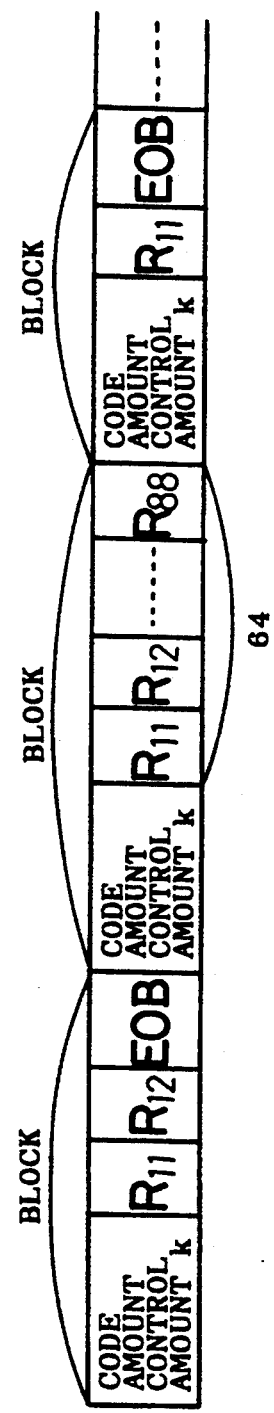
FIG. 5 is a diagrammatic view illustrating the construction of block data employed in the compression/decompression method for image data illustrated in FIGS. 4(a) and 4(b).

FIG. 1(b) illustrates the processing of a decompression method of the compression/decompression method for image of the present embodiment. The present decompression method comprises a separating step S11 of separating the coded data and the quantization coefficient set $[Q_{ij}']$ from the compressed data, a quantization coefficient set extracting step S12 of extracting the quantization coefficient set $[Q_{ij}']$ separated at step S11, a decoding step S13 of decoding the coded data separated at the separating step S11 in units of data of one block to obtain the quantization conversion coefficient set $[R_{ij}']$, a code amount control amount extracting step S14 of extracting, from the quantization conversion coefficient set $[R_{ij}']$ obtained by the decoding at step S13, the code amount control amount k which has been replaced by the quantization conversion coefficient $R_{88}$ of the maximum frequency component, a dequantizing step S15 of multiplying the quantization conversion coefficient set $[R_{ij}']$ obtained by the decoding at the decoding step S13 by the quantization coefficient set $[Q_{ij}']$ extracted at the quantization coefficient set extracting step S12 and the code amount control amount k extracted at the code amount control amount extracting step S14 to effect dequantization, an inverse DCT transforming step S16 of transforming the conversion coefficient set $[S_{ij}']$ obtained by the dequantization at step S15 by inverse DCT transformation, and a block/raster converting step S17 of performing deblocking processing to convert block data obtained by the inverse DCT transformation at step S16 into raster data.

Subsequently, such compression method and decompression methods of the compression/decompression method for image data of the first embodiment will be described in detail.

(1) Compression Method

After image data (raster data) are fetched, the raster data are converted into block data of 8*8 dots at step S1. Then at step S2, the block data obtained by the conversion at step S1 are transformed by DCT transformation to produce a conversion coefficient set $[S_{ij}]$ (i = 1 to 8, j = 1 to 8) (refer to, for example, the conversion coefficient set $[S_{ij}]$ of FIG. 2(a)).

Subsequently, at step S3, a code amount control amount k (>0, a real number) for normalizing the amount of codes to be generated from the conversion coefficient set $[S_{ij}]$ obtained by the DCT transformation at step S2 is decided. In order to effect control of the amount of codes, the quantization coefficient set $[Q_{ij}]$ should be multiplied by the code amount control amount k, and when the amount of codes is equal to or greater than a target value, k should be set to $1 \leq k$, but when the amount of codes is smaller than the target value, k should be set to $0 < k < 1$. For example, where the sum total $\Sigma\Sigma S_{ij}$ of the conversion coefficient set $[S_{ij}]$ is represented by A and the target amount of codes is represented by B, since the amount of codes is inclined to increase in proportion to the sum total A of the conversion coefficient set $[S_{ij}]$, the equation $k=(A/B)\cdot(1/C)$ is set and the conversion coefficient set $[S_{ij}]$ at which the amount of codes when the code conversion set $[S_{ij}]$ is coded is equal to B is determined empirically, while the constant C at which k is equal to 1 with the values of A and B then is determined in advance, and then k is determined from the equation above.

Then at step S4, the conversion coefficient set 8 $S_{ij}]$ obtained by the dCt transformation at step S2 is divided by the quantization coefficient set $[Q_{ij}]$ determined in advance for data of each block and the code amount control amount k to effect quantization. In particular, conversion coefficients $S_{ij}$ of the conversion coefficient set $[S_{ij}]$ are divided by: the corresponding quantization coefficients $Q_{ij}$ of the quantization coefficient set $[Q_{ij}]$ multiplied by the code amount control amount k. The quotients are rounded to obtain a quantization conversion coefficient set $[R_{ij}]$ consisting of quantization conversion coefficients $[R_{ij}]$. FIG. 3(a) illustrates concrete examples of numerical values when the code amount control amount k is k=2.

Subsequently, at step S5, the quantization conversion coefficient $R_{88}$ of a maximum frequency component (e.g. $R_{88}$) of the quantization conversion coefficient set $[R_{ij}]$ obtained by the quantization at the quantizing step S4 is replaced with the code amount control amount k to obtain another quantization conversion coefficient set $[R_{ij}']$.

Then at step S6, the quantization conversion coefficient set $[R_{ij}']$ obtained at the code amount control amount replacing step S5 is coded by Huffman coding or a like coding method to obtain coded data.

Then, it discriminated at next step S10 whether or not block data for one frame have been coded, and if block data for one frame have not been coded, then the control sequence returns to step S1.

Meanwhile, at step S7, a quantization coefficient set $[Q_{ij}']$ wherein the quantization coefficient $Q_{88}$ of the quantization coefficient set $[Q_{ij}]$ corresponding to the quantization conversion coefficient $R_{88}$ has been changed to 0 is obtained. In particular, the one quantization coefficient $Q_{88}$ of the quantization coefficient set $[Q_{88}$ is operated to change the value of it to 0 to mask the quantization conversion coefficient $R_{88}(=k)$ of the quantization conversion coefficient set $[R_{ij}]$ corresponding to this portion. By doing this, at the later dequantizing step S15, a conversion coefficient $S_{88}$ of the conversion coefficient set $[S_{ij}]$ corresponding to the quantization coefficient $Q_{88}$ is necessarily changed to 0 is set to 0 so that the value k, which has replaced $R_{88}$, is not later multiplied by the actual $Q_{88}$ value to generate an erroneous result for $S_{88}'$). Since the conversion coefficients $S_{ij}$ of high frequency components (e.g. $S_{88}'$) of the conversion coefficient set $[S_{ij}']$ would ordinarily be equal to 0 after quantization anyway, the selection of the quantization coefficient $Q_{88}$ and quantization conversion coefficient $R_{88}$ to perform this operation advantageously minimizes the likelihood that the operation will impact the resulting $[S_{ij}']$. By the operation in this manner, the quantization coefficient of the masked portion $Q_{88}$ is always changed to 0, and accordingly, even though the code amount control amount k replaces the quantization conversion coefficient $R_{88}$, the conversion coefficient set $[S_{ij}']$ is not changed by the value of the code amount control amount k at all (i.e., $S_{88}'$ will properly be calculated to be zero).

When block data for one frame is coded, the coded data for one frame and the quantization coefficient set $[Q_{ij}']$ are composed to produce compressed data at the composing step S8, thereby ending the processing.

(2) Decompression Method

After compressed data is input, coded data for one frame and a quantization coefficient set $[Q_{ij}']$ are separated from each other at step S11.

Then at step S12, the quantization coefficient set $[Q_{ij}']$ is extracted.

Subsequently at step S13, the coded data for one block are decoded to obtain a quantization conversion coefficient set $[R_{ij}']$.

Then at step S14, the code amount control amount k is extracted from the quantization conversion coefficient $R_{88}$ of the quantization conversion coefficient set $[R_{ij}]$.

Subsequently at step S15, the quantization conversion coefficients $R_{ij}$ of the quantization conversion coefficient set $[R_{ij}']$ are multiplied by the quantization coefficients $Q_{ij}$ of the quantization coefficient set $[Q_{ij}']$ and the code amount control amount k to effect dequantization to obtain a conversion coefficient set $[S_{ij}']$. FIG. 3(b) shows examples of numerical values when the code amount control amount k is k=2.

Then at step S16, the conversion coefficient set $[S_{ij}']$ is transformed by inverse DCT transformation to obtain block data.

Subsequently, at step S17, the block data are processed by deblocking processing to convert the same into raster data.

Such decompression processing at the steps S13 to S17 as described above is repeated for data of each block for one frame, and after it is discriminated at step S18 that the decompression processing for one frame is completed, reproduction of image data is completed thereby.

It is to be noted that, while, in the first embodiment described above, raster data of one frame is divided into block data of 8*8 dots, the size of block data is not limited to 8*8 dots, but raster data can be divided generally into block data of m*n (m and n are positive integral numbers) dots. Further, while the quantization conversion coefficient $R_{88}$ (maximum frequency component of the quantization conversion coefficient set $[R_{ij}]$) is replaced with the code amount control amount k, it is a matter of course that the quantization conversion coefficient to be replaced with the code amount control amount k is not limited to the quantization conversion coefficient $R_{88}$.

FIG. 4(a) illustrates the processing of a compression method of the compression/decompression method for image data according to a second embodiment of the present invention. The present compression method for image data includes a raster/block converting step S41 of converting raster data into block data of 8*8 dots, a DCT transforming step S42 of transforming the block data obtained by the conversion at step S41 by DCT transformation to produce a conversion coefficient set $[S_{ij}]$, a code amount control amount deciding step S43 of deciding a code amount control amount k for making uniform the amount of codes to be produced from the conversion coefficient set $[S_{ij}]$ obtained by the DCT transformation at step S42, a quantizing step S44 of dividing the conversion coefficient set $[S_{ij}]$ obtained by the DCT transformation at the DCT transforming step S42 by a quantization coefficient set $[Q_{ij}]$ determined in advance for data of each one block and the code amount control amount k to effect quantization, a coding step S45 of coding the code amount control amount k decided at the code amount control amount deciding step S43 and the quantization conversion coefficient set $[R_{ij}]$ obtained by the quantization at the quantizing step S44 to produce coded data, and a composing step S46 of composing, when block data for one frame is coded, the coded data and the quantization coefficient set $[Q_{ij}]$ to produce compressed data.

FIG. 4(b) illustrates the processing of a decompression method of the compression/decompression method for image data according to the second embodiment of the present invention. The present decompression method for image data comprises a separating step S51 of separating the coded data and the quantization coefficient set $[Q_{ij}]$ from the compressed data, a quantization coefficient set extracting step S52 of extracting the quantization coefficient set $[Q_{ij}]$ separated at step S51, a decoding step S53 of decoding the coded data separated at the separating step S51 in units of data of one block to obtain the decoded data, a code amount control amount/quantization conversion coefficient set separating step S54 of separating the decoded data obtained by the decoding at step S53 into the code amount control amount k and the quantization conversion coefficient set $[R_{ij}]$, a dequantizing step S55 of multiplying the quantization conversion coefficient set $[R_{ij}]$ obtained by the separation at step S54 by the quantization coefficient set $[Q_{ij}]$ and the code amount control amount k to effect dequantization to produce the conversion coefficient set $[S_{ij}]$, an inverse DCT transforming step S56 of transforming the conversion coefficient set $[S_{ij}]$ obtained by the dequantization at step S55 by inverse DCT transformation, and a block/raster converting step S57 of performing deblocking processing to convert the block data obtained by the inverse DCT transformation at step S56 into the raster data.

Normally, when it is tried to code the quantization conversion coefficient set $[R_{ij}]$ by Huffman coding, Huffman coded data are constituted from a run length, a group number and an EOB (End of Block) in units of data for one block of the quantization conversion coefficient set $[R_{ij}]$. However, in the compression/decompression method for image data of the present embodiment, Huffman coded data are constructed such that the first component of block data is ensured as a portion for a code amount control amount k and the second to 65th components include effective data +a run length +a group number. Further, the breakpoint of the quantization conversion coefficient set $[R_{ij}]$ is provided by an EOB or effective data.

Subsequently, such compression method and decompression method of the compression/decompression method for image data of the second embodiment will be described in detail.

(1) Compression Method

When image data (raster data) are fetched, the raster data are converted into block data of 8*8 dots at step S41.

Then at step S42, the block data obtained by the conversion at step S41 are transformed by DCT transformation to produce a conversion coefficient set $[S_{ij}]$.

Subsequently, at step S43, a code amount control amount k (>0, a real number) for normalizing the amount of codes to be produced from the conversion coefficient set $[S_{ij}]$ obtained by the DCT transformation at step S42 is decided similarly as at the code amount control amount deciding step S3 of FIG. 1(a).

Then at step S44, the conversion coefficient set $[S_{ij}]$ obtained by the DCT transformation at step S42 is divided by a quantization coefficient set $[Q_{ij}]$ determined in advance for data of each one block and the code amount control amount k and the quotient is rounded to effect quantization to obtain a quantization conversion coefficient $[R_{ij}]$.

Subsequently, at step S45, the code amount control amount k decided at step S43 and the quantization conversion coefficient set $[R_{ij}]$ obtained at step S44 are coded by Huffman coding or a like coding method to produce coded data for data of one block. In particular, the code amount control amount k is coded and then a dc component of the quantization conversion coefficient set $[R_{ij}]$ is coded, and when the ac components of the quantization conversion coefficient set $[R_{ij}]$ include an effective coefficient, the effective coefficient is coded. This coding is performed until after the ac components include no more effective coefficient.

Then, it is discriminated at step S47 whether or not block data for one frame have been coded, and if block data for one frame have not been coded, then the control sequence returns to step S41.

When block data for one frame are coded, at step S46, the coded data for one frame and the quantization coefficient set $[Q_{ij}]$ are composed to produce compressed data, thereby ending the processing.

(2) Decompression Method

After compressed data are inputted, coded data for one frame and a quantization coefficient set $[R_{ij}]$ are separated from the compressed data at step S51.

Then at step S52, a quantization coefficient set $[Q_{ij}]$ is extracted.

Subsequently at step S53, coded data for one block are decoded to obtain a code amount control amount k and a quantization conversion coefficient set $[R_{ij}]$.

Then at step S54, the code amount control amount k and the quantization conversion coefficient set $[R_{ij}]$ are separated from each other.

Subsequently, at step S55, the quantization conversion coefficient set $[R_{ij}]$ is multiplied by the quantization coefficient set $[Q_{ij}]$ and the code amount control amount k to effect dequantization to produce a conversion coefficient set $[S_{ij}']$.

Then at step S56, the conversion coefficient set $[S_{ij}]$ is transformed by inverse DCT transformation to reproduce block data.

Subsequently at step S57, deblocking processing is performed to convert the block data into raster data.

Such decompression processing of the steps S53 to S57 as described above is repeated for data of each one block for one frame, and if it is discriminated at step S18 that the decompression processing is completed for one frame, reproduction of image data for one frame is completed thereby.

It is to be noted that, while, in the second embodiment described above, the first component of block data is ensured as a portion for a code amount control amount k, it is matter of course that the portion to be ensured as a portion for a code amount control amount k need not necessarily be the first component of block data but may be any other portion.

Further, while, in the embodiments described above, the case wherein DCT transformation is used as spatial frequency conversion is described by way of an example, it is a matter of course that some other transform such as Hadamard transform, K-L (Karhunen-Loeve) transform, DST (Discrete Sine Transformation) may be used.

Having now fully described the invention, it will be apparent to one of ordinary skill in the art that many changes and modifications can be made thereto without departing from the spirit and scope of the invention as set forth herein.

What is claimed is:

1. A compression/decompression method for image data wherein block data which is image data after blocking is converted by spatial frequency conversion to obtain a conversion coefficient set and then the conversion coefficient set is divided by a product of a quantization coefficient set and a code amount control amount to obtain a quantization conversion coefficient set, comprising:
   a code amount control amount replacing step of replacing one of quantization conversion coefficients of a quantization conversion coefficient set with a code amount control amount;
   a coding step of coding the quantization conversion coefficient set obtained by the replacement to produce coded data;
   a decoding step of decoding the coded data in units of data of one block to obtain another quantization conversion coefficient set; and
   a code amount control amount extracting step of extracting, from the quantization conversion coefficient set obtained by the decoding, the code amount control amount which has been replaced by the one quantization conversion coefficient.

2. A compression/decompression method for image data as claimed in claim 1, wherein the quantization conversion coefficient to be replaced with the code amount control amount and the quantization conversion coefficient from which the code amount control amount is to be extracted are a maximum frequency component of the quantization conversion coefficient set.

3. A compression method for image data, comprising:
   a raster/block converting step of converting raster data into block data of m*n dots, m and n being positive integral numbers;
   a spatial frequency converting step of converting the block data obtained by the conversion by spatial frequency conversion to produce a conversion coefficient set;
   a code amount control amount deciding step of deciding a code amount control amount (k) for normalizing the amount of codes to be generated from the conversion coefficient set obtained by the spatial frequency conversion;

a quantizing step of dividing the conversion coefficient set obtained by the spatial frequency conversion by a quantization coefficient set determined in advance for data of each one block and the code amount control amount;

a code amount control amount replacing step of replacing one of quantization conversion coefficients of a quantization conversion coefficient set obtained by the quantization with the code amount control amount;

a coding step of coding the quantization conversion coefficient set obtained by the replacement to produce coded data;

a quantization coefficient masking step of changing a quantization coefficient of the quantization coefficient set which corresponds to the quantization conversion coefficient of the quantization conversion coefficient set to be replaced with the code amount control amount to 0; and a composing step of composing, when block data for one frame are coded, the coded data obtained by the coding at the coding step and the quantization coefficient set whose quantization coefficient has been changed to 0 at,the quantization coefficient masking step to produce compressed data.

4. A compression method for image data as claimed claim 3, wherein the spatial frequency conversion is discrete cosine transformation.

5. A compression method for image data as claimed in claim 3, wherein the quantization conversion coefficient to be replaced with the code amount control amount is a maximum frequency component of the quantization conversion coefficient set.

6. A decompression method for image data, comprising:

a separating step of separating coded data and a quantization coefficient set from compressed data;

a quantization coefficient set extracting step of extracting the separated quantization coefficient set;

a decoding step of decoding the coded data separated at the separating step in units of data of one block to obtain a quantization conversion coefficient set;

a code amount control amount extracting step of extracting, from the quantization conversion coefficient set obtained by the decoding, a code amount control amount which has been replaced by one of quantization conversion coefficients;

a dequantizing step of multiplying the quantization conversion coefficient set obtained by the decoding at the decoding step by the quantization coefficient set extracted at the quantization coefficient set extracting step and the code amount control amount extracted at the code amount control amount extracting step to effect dequantization;

an inverse spatial frequency converting step of converting the conversion coefficient set obtained by the dequantization by inverse spatial frequency conversion; and a block/raster converting step of performing deblocking processing to convert block data obtained by the inverse spatial frequency conversion into raster data.

7. A decompression method for image data as claimed in claim 6, wherein the inverse spatial frequency conversion is an inverse discrete cosine transform.

8. A decompression method for image data as claimed in claim 6, wherein the quantization conversion coefficient from which the code amount control amount is to be extracted is a maximum frequency component of the quantization conversion coefficient set.

9. A compression/decompression method for image data, comprising:

a raster/block converting step of converting raster data into block data of m*n dots, m and n being positive integral numbers;

a spatial frequency converting step of converting the block data obtained by the conversion by spatial frequency conversion to produce a conversion coefficient set;

a code amount control amount deciding step of deciding a code amount control amount for normalizing the amount of codes to be generated from the conversion coefficient set obtained by the spatial frequency conversion;

a quantizing step of dividing the conversion coefficient set obtained by the spatial frequency conversion by a quantization coefficient set determined in advance for data of each one block and the code amount control amount;

a code amount control amount replacing step of replacing one of quantization conversion coefficients of a quantization conversion coefficient set obtained by the quantization with the code amount control amount;

a coding step of coding the quantization conversion coefficient set obtained by the replacement to produce coded data;

a quantization coefficient masking step of changing a quantization coefficient of the quantization coefficient set which corresponds to the quantization conversion coefficient of the quantization conversion coefficient set to be replaced with the code amount control amount to 0;

a composing step of composing, when block data for one frame are coded, the coded data obtained by the coding at the coding step and the quantization coefficient set whose quantization coefficient has been changed to 0 at the quantization coefficient masking step to produce compressed data;

a separating step of separating the coded data and the quantization coefficient set from compressed data;

a quantization coefficient set extracting step of extracting the separated quantization coefficient set;

a decoding step of decoding the coded data separated at the separating step in units of data of one block to obtain the quantization conversion coefficient set;

a code amount control amount extracting step of extracting, from the quantization conversion coefficient set obtained by the decoding, the code amount control amount which has been replaced by the quantization conversion coefficient;

a dequantizing step of multiplying the quantization conversion coefficient set obtained by the decoding at the decoding step by the quantization coefficient set extracted at the quantization coefficient set extracting step and the code amount control amount extracted at the code amount control amount extracting step to effect dequantization;

an inverse spatial frequency converting step of converting the conversion coefficient set obtained by the dequantization by inverse spatial frequency conversion; and a block/raster converting step of performing deblocking processing to convert block data obtained by the inverse spatial frequency conversion into raster data.

10. A compression/decompression method for image data as claimed in claim 9, wherein the spatial frequency conversion is a discrete cosine transformation, and the an inverse spatial frequency conversion is inverse discrete cosine transformation.

11. A compression/decompression method for image data as claimed in claim 9, wherein the quantization conversion coefficient to be replaced with the code amount control amount and the quantization conversion coefficient from which the code amount control amount is to be extracted are a maximum frequency component of the quantization conversion coefficient set.

12. A compression/decompression method for image data, comprising:
- a coding step of coding a code amount control amount and a quantization conversion coefficient set as data of one block to produce coded data;
- a decoding step of decoding the coded data in units of data of one block to obtain decoded data; and
- a code amount control amount/quantization conversion coefficient set separating step of separating the decoded data obtained by the decoding into the code amount control amount and the quantization conversion coefficient set.

13. A compression/decompression method for image data as claimed in claim 12, wherein the first components of the coded data and the decoded data are the code amount control amount, and the second to 65th components are the quantization conversion coefficients.

14. A compression method for image data, comprising:
- a raster/block converting step of converting raster data into block data of m*n dots, m and n being positive integral numbers;
- a spatial frequency converting step of converting the block data obtained by the conversion by spatial frequency conversion to produce a conversion coefficient set;
- a code amount control amount deciding step of deciding a code amount control amount for normalizing the amount of codes to be generated from the conversion coefficient set obtained by the spatial frequency conversion;
- a quantizing step of dividing the conversion coefficient set obtained by the spatial frequency conversion at the spatial frequency converting step by a quantization coefficient set determined in advance for data of each one block and the code amount control amount;
- a coding step of coding the code amount control amount decided at the code amount control amount deciding step and the quantization conversion coefficient set obtained by the quantization at the quantizing step as data of one block to produce coded data; and
- a composing step of composing, when block data for one frame are coded, the coded data obtained by the coding at the coding step and the quantization coefficient set to produce compressed data.

15. A compression method for image data as claimed in claim 14, wherein the spatial frequency conversion is a discrete cosine transformation.

16. A compression method for image data as claimed in claim 14, wherein the first component of the coded data is the code amount control amount, and the second to 65th components are the quantization conversion coefficients.

17. A decompression method for image data, comprising:
- a separating step of separating coded data and a quantization coefficient set from compressed data;
- a quantization coefficient set extracting step of extracting the separated quantization coefficient;
- a decoding step of decoding the coded data separated at the separating step in units of data of one block to obtain decoded data;
- a code amount control amount/quantization conversion coefficient set separating step of separating the decoded data obtained by the decoding into a code amount control amount and a quantization conversion coefficient set;
- a dequantizing step of multiplying the separated quantization conversion coefficient by the quantization coefficient set extracted at the quantization coefficient set extracting step and the code amount control amount to effect dequantization;
- an inverse spatial frequency converting step of converting the conversion coefficient set obtained by the dequantization by inverse spatial frequency conversion; and
- a block/raster converting step of performing deblocking processing to convert block data obtained by the inverse spatial frequency conversion into raster data.

18. A decompression method for image data as claimed in claim 17, wherein the inverse spatial frequency conversion is an inverse discrete cosine transform.

19. A decompression method for image data as claimed in claim. 17, wherein the first component of the decoded data is the code amount control amount, and the second to 65th components are the quantization conversion coefficients.

20. A compression/decompression method for image data, comprising:
- a raster/block converting step of converting raster data into block data of m*n dots, m and n being positive integral numbers;
- a spatial frequency converting step of converting the block data obtained by the conversion by spatial frequency conversion to produce a conversion coefficient set;
- a code amount control amount deciding step of deciding a code amount control amount for normalizing the amount of codes to be generated from the conversion coefficient set obtained by the spatial frequency conversion;
- a quantizing step of dividing the conversion coefficient set obtained by the spatial frequency conversion at the spatial frequency converting step by a quantization coefficient set determined in advance for data of each one block and the code amount control amount;
- a coding step of coding the code amount control amount decided at the code amount control amount deciding step and the quantization conversion coefficient set obtained by the quantization at the quantizing step as data of one block to produce coded data;
- a composing step of composing, when block data for one frame are coded, the coded data obtained by the coding at the coding step and the quantization coefficient set to produce compressed data;

a separating step of separating the coded data and the quantization coefficient set from compressed data;

a quantization coefficient set extracting step of extracting the separated quantization coefficient;

a decoding step of decoding the coded data separated at the separating step in units of data of one block to obtain decoded data;

a code amount control amount/quantization conversion coefficient set separating step of separating the decoded data obtained by the decoding into the code amount control amount and the quantization conversion coefficient set;

a dequantizing step of multiplying the separated quantization conversion coefficient by the quantization coefficient set extracted at the quantization coefficient set extracting step and the code amount control amount to effect dequantization;

an inverse spatial frequency converting step of converting the conversion coefficient set obtained by the dequantization by inverse spatial frequency conversion; and a block/raster converting step of performing deblocking processing to convert block data obtained by the inverse spatial frequency conversion into raster data.

21. A compression/decompression method for image data as claimed in claim 20, wherein the spatial frequency conversion is a discrete cosine transformation, and the inverse spatial frequency conversion is inverse discrete cosine transformation.

22. A compression/decompression method for image data as claimed in claim 20, wherein the first components of the coded data and the decoded data are the code amount control amount, and the second to 65th components are the quantization conversion coefficients.

* * * * *

UNITED STATES PATENT AND TRADEMARK OFFICE
CERTIFICATE OF CORRECTION

PATENT NO.   : 5,432,615
DATED        : July 11, 1995
INVENTOR(S)  : Mitsuhiro WATANABE It is certified that error(s) appears in the above-identified patent and that said Letters Patent is hereby corrected as shown below:

Col.6, line 26, delete "$S_{ij}$]" and insert --[$S_{ii}$]--.

Col. 6, line 61, delete "[$Q_{88}$" and insert --[$Q_{ij}$]--.

Col. 6, line 61, after "o" insert --(i.e., $Q_{88}$--.

Col. 6, line 66, delete "[$S_{ij}$]" and insert --[$S_{ij'}$]--.

Col. 8, line 47, delete "[$S_{ij}$] and insert --[$S_{ij'}$]--.

Signed and Sealed this

Fifth Day of March, 1996

*Attest:*

BRUCE LEHMAN

*Attesting Officer*      *Commissioner of Patents and Trademarks*